United States Patent Office 3,330,743

Patented July 11, 1967

3,330,743

PROCESS OF MANUFACTURING ALUMINUM-BASE OFFSET PRINTING PLATES

Karl Jestl, 2a–4 Lerchenfelderstrasse, and Rudolf Postrihac, 1 Gerichtsgasse, both of Vienna, Austria No Drawing. Filed June 10, 1963, Ser. No. 286,461
Claims priority, application Austria, June 15, 1962, 4,849/62
13 Claims. (Cl. 204—33)

This invention relates to a process of producing offset printing plates from sheets of aluminium or aluminium alloys with the aid of chemical, electrolytic and anodic process steps. Besides, the invention relates to the offset printing plates themselves, which are particularly suitable for medium and high printing capacities.

The printing properties of offset printing plates depend to a large extent on the printing properties of their surface. The required properties include, inter alia, an extremely fine grain, a good anchorage for the layers to be applied, a good retention of water, an insensitivity to grease, a high hardness of the surface, a good stability of the plate, an absolute planarity of the plate, etc., particularly because the usual anodizing treatment of sheets pretreated in acid pickling baths results in a very considerable removal of the protruding portions of the grains.

It has now been found that a four-step treatment enables the manufacture of a material for offset printing plates which meets the above-mentioned requirements as to printing properties to a surprisingly high degree. The process according to the invention resides essentially in the following four steps:

(I) First etching an aluminum-base plate with an acid pickling solution;

(II) Then uniformly electrolytically roughening the plate with alternating current in an electrolyte which contains nitric acid and additionally spent sulfite liquor, an aromatic aldehyde, an aromatic ketone or their derivatives and/or hydroaromatic products such as pine needle oil;

(III) Anodizing the plate in a direct current process electrolyte; and subsequently (IV) Treating with an aqueous rinsing bath which contains spent sulfite liquor, an aromatic aldehyde, an aromatic ketone or their derivatives and/or hydroaromatic products such as pine needle oil, and drying.

Aromatic components suitable for use for the purpose of the invention and capable of preventing a coagulation of lignin in the form of lignin sulfonic acid include aromatic aldehydes such as benzaldehyde and vanillin, aromatic ketones, such as acetophenone and benzophenone, and their derivatives, such as curcumin.

The plates which are obtained by the process described prove excellently suitable for offset printing. Depending on the temperatures and current densities which have been maintained during their manufacture and which may be maintained in dependence on the nature of the bath to provide for a higher or lower stability of the plate, 500,000 to 1,000,000 and more copies of perfectly uniform quality can be obtained from each plate.

Specifically, the four-step treatment is performed as follows:

In the first step of the treatment, the plates are treated in an acid pickling bath to deoxidize the plates and remove the skin formed thereon by rolling. During this treatment, the plate must remain perfectly planar and a relief formation or etching at the grain boundaries must not occur. Mixtures of nitric acid and hydrofluoric acid, known per se, are most suitable for this purpose.

During the second step of the treatment, the plate is electrolytically roughened to impart a grain structure to it by means of alternating current in a nitric acid electrolyte so as to obtain an extremely fine uniform grain having a particle size of an order of 2 microns and to prevent, owing to the composition of the electrolyte, an attack of the plate surface, which attack might result in surface irregularities or changes in particle size. This process step is of special importance in the overall treatment according to the present invention.

The anodizing of the plate in the third step of the treatment corresponds basically to the known eloxation electrolyte oxidation of aluminium in direct current process acid baths. Care should be taken that a re-dissolving of the aluminium or aluminium oxide, which involves a removal of the protruding portions of the grain, is inhibited as far as possible.

The rinsing effected in the fourth step in a bath which except for the acid content has qualitatively the same active ingredients as the electrolytic roughening bath in the second step of the treatment, serves for preserving the printing properties of the superficially oxidized plate. If the pores of the electrolytically oxidized surfaces were sealed as usual by a treatment with boiling water, this would reduce the printing properties of the plate to such an extent that it would no longer be suitable at all for printing.

In the practice of the process according to the invention, the electrolyte used in the second step of the treatment contains preferably 1–3% by volume of nitric acid, 1–3% by volume of spent sulfite liquor having a content of 1–20% by weight of lignin in the form of lignin sulfonic acid and consisting of colloid particles having an order of magnitude of up to 120 Angström units, and up to about 1% by volume of the aromatic and/or hydroaromatic component, which is capable of preventing a coagulation of lignin at an operating temperature up to 30° C., possibly up to 100° C. This electrolytic roughening treatment is suitably carried out at room temperature and effected with alternating current of preferably 15–75 cycles per second, 10–20 volts and 0.25–0.75 ampere per square decimeter, if desired up to 2 amperes per square decimeter. The depth of roughness which can thus be obtained is uniform and lies between 1.5 and 2.5 microns, depending on the current density and the density of the bath. This treatment results in a perfectly uniform removal of the surface and in a reduction of the time of the treatment to approximately one fifth. Because any dissolution of aluminium takes place only to a very small extent, the baths can be used at least four times longer than would otherwise be expected.

For the fourth step of the treatment, a rinsing bath has proved particularly suitable which contains about 0.5 to 20% by volume of spent sulfite liquor having a content of 1 to 20% by weight of lignin in the form of lignin sulfonic acid and consisting of colloid particles of an order of magnitude up to 120 Angstrom units, and up to about 1% by volume of the aromatic and/or hydroaromatic component, which is capable of preventing the ciagulation of lignin sulfonic acid up to an operating temperature of 30° C., if desired up to 100° C. This rinsing bath is suitably also employed at room temperature and serves to render the oxide layer insensitive to grease and dirt and to ensure the retention of water and the anchoring of the coating.

According to another embodiment of the invention, the electrolyte suggested for the third step of the treatment is a modified direct current process sulfuric acid electrolyte for anodizing the printing plate, which electrolyte contains about 16–18% by weight of sulfuric acid, about 1.2–1.6% by weight of oxalic acid, about 2.5–5% by volume of spent sulfite liquor containing 1–20% by weight of lignin in the form of lignin sulfonic acid and consisting of colloid particles of an order of magnitude of up to 120 Angstrom units, and up to about 1% by volume of the aromatic and/or hydroaromatic component, which is capable of preventing a coagulation of lignin sulfonic acid up to an operating temperature of 30° C., if desired up to 100° C. This electrolytic oxidizing process is preferably effected with direct current of about 16 volts at a current density of about 2.2 to 2.5 amperes per square decimeter and in a temperature range of about 20–30° C., preferably 22–25° C. In spite of its high density, which is mainly due to the relatively high sulfuric acid content, the described electrolyte has such a low redissolving power that the protruding portions of the grains having a height of about 1.5 to at most 2.5 microns are not removed during the anodizing treatment carried out during a time of about 5 minutes although the thickness of the oxide layer is only about 6 to 10 microns. In addition to the fact that the redissolving of aluminium and/or aluminium oxide is inhibited to a large extent, any unpermissible evolution of gas (excepting hydrogen and oxygen) is prevented. The special effect of this modified direct current process electrolyte is seen in that the protruding portions of the grains produced in a height of about 1.5 to 2.5 microns during the preceding electrolytic roughening or graining treatment and most important for the printing operation are perfectly preserved in size. In this connection it has been observed that a redissolving of aluminium or aluminium oxide will not take place when the aluminium sulfate content in the electrolyte has reached a value of about 1 grain per liter.

According to the invention, the first step of the treatment carried out with a nitric acid and hydrofluoric acid pickling bath can be further improved by the application of the spent sulfite liquor together with the aromatic and/or hydroaromatic component. For this purpose it is suitable to operate at room temperature and to use a pickling solution which contains about 8–50% by volume of nitric acid, about 5–25% by weight of ammonium difluoride, about 4–10% by volume of spent sulfite liquor containing 1–20% of lignin in the form of lignin sulfonic acid and consisting of colloid particles of an order of magnitude of up to 120 Angstrom units, and up to about 1% by volume of the aromatic and/or hydroaromatic component, which is capable of preventing the coagulation of lignin sulfonic acid up to a temperature of about 30° C., if desired up to 100° C. This pickling bath will form a protective layer by itself to inhibit a formation of fumes to a very large extent so that the operation may be performed indoors without difficulty. Besides, insoluble residues will not be formed in the bath. The removal of material is effected in an entirely uniform manner and the reaction is discontinued immediately when the workpieces are removed from the bath.

In the subsequent example it will be shown how the new process may be performed, although the invention is not restricted to this example.

*Example*

An aluminium plate which is about 0.5 millimeter thick and has a size of 104 centimeters x 127 centimeters and may have a grease layer on its surface is treated at room temperature for two minutes with a solution of 15 parts by volume of concentrated nitric acid (63%), 5 parts by volume of solid ammonium difluoride, 4 parts by volume of spent sulfite liquor (density 1.12), 1 part by volume of pine needle oil and 76 parts by volume of salt-free water.

In the second process stage, the plate is electrolytically roughened by a treatment at room temperature for 5 minutse in a solution of 1 part by volume of cencentrated nitric acid (63%), 1 part by volume of spent sulfite liquor (density 1.12), 0.5 part by volume benzaldehyde and 97.5 parts by volume of salt-free water, which solution is flown through by alternating current having a current density of 0.3 to 0.4 ampere per square decimeter.

The plate which has thus been roughened is now oxidized in the third process step by a treatment with a direct current process electrolyte having the following composition: 15 parts by volume of concentrated sulfuric acid (density 1.84), 1.5 parts by volume of solid oxalic acid, 2.5 parts by volume of spent sulfite liquor (density 1.12), 0.5 part by volume of pine needle oil, 0.5 part by volume of benzaldehyde and 80 parts by volume of salt-free water. Anodizing is effected with a current density of 2.5 amperes per square decimeter at 20° C. for 10 minutes.

In the fourth process step the anodized plate is treated with a rinsing bath consisting of 2 parts by volume of spent sulfite liquor (density 1.12), 0.5 part by volume of pine needle oil, 0.5 part by volume of benzophenone and 97 parts by volume of salt-free water. This is effected by a short dipping of the plate into the rinsing bath at room temperature, whereafter the plate is dried in an air stream.

The anodized plates which have been treated by the four-step process according to the invention and have been dried after the rinsing bath are entirely insensitive to grease and have hydrophilic properties and best anchoring properties with respect to the various coatings provided with the preparations that are suitable or usual for the printing process. This indicates a substantial progress over the known printing process, in which the photographic printing varnish consisting, e.g., of an oleophilic synthetic plastic material, would have to be anchored by an acid treatment.

What we claim is:

1. A process of manufacturing offset printing plates, which comprises the steps of:

(a) etching an aluminum-base plate with an acid pickling solution;

(b) uniformly roughening the pretreated plate by an atlernating current electrolytic treatment in an electrolyte which contains nitric acid, spent sulfite liquor and at least one aromatic compound selected from the group consisting of benzaldehyde, vanillin, acetophenone, benzophenone, curcumin, and of pine needle oil;

(c) anodizing the roughened plate in a direct current process anodizing electrolyte;

(d) treating the anodized plate with an aqueous rinsing bath which contains spent sulfite liquor and at least one substance selected from the group consisting of benzaldehyde, vanillin, acetophenone, benzophenone, curcumin, and of pine needle oil, and then drying the plate.

2. The process as set forth in claim 1, in which said alternating current electrolytic treatment in the second step (b) is carried out with an electrolyte which contains about 1–3% by volume of nitric acid, about 1–3% by volume spent sulfite liquor containing 1–20% by weight lignin in the form of lignin sulfonic acid and consisting of colloid particles having an order of magnitude up to 120 Angstrom units, said aromatic compound being contained in said electrolyte in an amount of up to about 1% by volume and capable of preventing a coagulation of lignin sulfonic acid up to an operating temperature of 30° C.

3. A process as set forth in claim 2, in which said aromatic compound in said electrolyte used in said alternating current electrolytic treatment is capable of preventing a coagulation of lignin sulfonic acid at an operating temperature up to 100° C.

4. A process as set forth in claim 2, in which said alternating current electrolytic treatment is carried out at room temperature with alternating current of 15 to 75 cycles per second, 10 to 20 volts and a current density of 0.25 to 2 amperes per square decimeter.

5. A process as set forth in claim 1, in which said aqueous rinsing bath employed in the fourth step contains about 0.5 to 20% by volume of spent sulfite liquor containing 1 to 20% by weight of lignin in the form of lignin sulfonic acid and consisting of colloid particles of an order of magnitude of up to 120 Angstrom units, and the bath contains up to about 1% by volume of said aromatic compounds capable of preventing a coagulation of lignin sulfonic acid at an operating temperature up to 30° C.

6. A process as set forth in claim 5, in which said aromatic compound contained in said aqueous rinsing bath is capable of preventing a coagulation of lignin sulfonic acid at an operating temperature up to 100° C.

7. A process as set forth in claim 1, in which the direct current process electrolyte employed in the third step contains about 16–18% by weight of sulfuric acid, about 1.2–16% by weight of oxalic acid, about 2.5–5% by volume of spent sulfite liquor containing 1–20% by weight lignin in the form of lignin sulfonic acid and consisting of colloid particles having an order of magnitude up to 120 Angstrom units, and up to about 1% by volume of said aromatic compound capable of preventing a coagulation of lignin sulfonic acid at an operating temperature up to 30° C.

8. A process as set forth in claim 7, in which said aromatic compound contained in said direct current process electrolyte is capable of preventing a coagulation of lignin sulfonic acid at an operating temperature up to 100° C.

9. A process as set forth in claim 7, in which said anodizing is carried out with direct current at about 16 volts,a current density of about 2.2 to 2.5 amperes per square decimeter and a temperature of about 20–30° C.

10. A process as set forth in claim 1, in which said acid pickling solution employed in the first step contains about 8–50% by volume of nitric acid, about 5–25% by weight of ammonium difluoride, about 4–10% by volume of spent sulfite liquor containing 1–20% lignin in the form of lignin sulfonic acid and consisting of colloid particles having an order of magnitude up to 120 Angstrom units, and up to about 1% by volume of said aromatic compound capable of preventing a coagulation of lignin sulfonic acid at an operating temperature up to 30° C.

11. A process as set forth in claim 10, in which said etching is carried out at room temperature.

12. A process as set forth in claim 10, in which said aromatic compound in said pickling solution is capable of preventing a coagulation of lignin sulfonic acid at an operating temperature up to 100° C.

13. The process of claim 1, in which the aromatic compound is benzaldehyde.

References Cited

UNITED STATES PATENTS

| | | | |
|---|---|---|---|
| 2,270,712 | 1/1942 | Wood | 101—149.2 |
| 2,755,238 | 7/1956 | Turner | 204—33 |
| 2,756,131 | 7/1956 | Neunzig | 101—149.2 |
| 2,937,085 | 5/1960 | Seven et al. | 96—33 |
| 3,026,255 | 3/1962 | Riou et al. | 204—33 |
| 3,046,126 | 7/1962 | Sus et al. | 96—33 |
| 3,146,178 | 8/1964 | Cochran | 204—58 |
| 3,175,963 | 3/1965 | Kessler | 204—35 |

FOREIGN PATENTS

| | | |
|---|---|---|
| 636,293 | 4/1950 | Great Britain. |

OTHER REFERENCES

The Condensed Chemical Dictionary, 6th edition, Reinhold Co., 1961, pages 876 and 877 relied on.

JOHN H. MACK, *Primary Examiner.*

NORMAN G. TORCHIN, *Examiner.*

R. L. STONE, W. VAN SISE, *Assistant Examiners.*